United States Patent
Moseman et al.

(10) Patent No.: US 10,645,348 B2
(45) Date of Patent: May 5, 2020

(54) DATA COMMUNICATION BETWEEN IMAGE SENSORS AND IMAGE DISPLAYS

(71) Applicant: Sensors Unlimited, Inc., Princeton, NJ (US)

(72) Inventors: Samuel Moseman, Orange, CA (US); Mathew Canahuati, Corona, CA (US)

( * ) Notice: Subject to any disclaimer, the term of this patent is extended or adjusted under 35 U.S.C. 154(b) by 0 days.

(21) Appl. No.: 16/029,583

(22) Filed: Jul. 7, 2018

(65) Prior Publication Data
US 2020/0014887 A1 Jan. 9, 2020

(51) Int. Cl.
*H04N 5/232* (2006.01)
*H04N 7/18* (2006.01)
*H04N 1/00* (2006.01)
*F41G 3/16* (2006.01)

(52) U.S. Cl.
CPC .......... *H04N 7/183* (2013.01); *F41G 3/165* (2013.01); *H04N 1/00129* (2013.01); *H04N 5/232411* (2018.08); *H04N 2201/0022* (2013.01); *H04N 2201/0084* (2013.01)

(58) Field of Classification Search
None
See application file for complete search history.

(56) References Cited

U.S. PATENT DOCUMENTS

| | | |
|---|---|---|
| 2,452,592 A | 11/1948 | Meyer |
| 2,627,659 A | 2/1953 | Murr |
| 2,901,750 A | 9/1959 | McMurry |
| 2,901,751 A | 9/1959 | Gales et al. |
| 2,908,943 A | 10/1959 | Miller |
| 3,320,619 A | 5/1967 | Lastnik et al. |
| 3,413,656 A | 12/1968 | Vogliano et al. |
| 3,419,334 A | 12/1968 | Hubbard |
| 3,594,062 A | 7/1971 | Disley |
| 3,669,523 A | 6/1972 | Edwards |
| 4,044,399 A | 8/1977 | Morton |
| 4,584,776 A | 4/1986 | Shepherd |

(Continued)

FOREIGN PATENT DOCUMENTS

| | | |
|---|---|---|
| CN | 202057884 | 11/2011 |
| CN | 204730844 | 10/2015 |

(Continued)

OTHER PUBLICATIONS

Aebi, V. et al., "EBAPS: Next Generation, Low Power, Digital Night Vision", Presented at the OPTRO 2005 International Symposium, May 10, 2005, pp. 1-10, Paris, France, in 10 pages.

(Continued)

*Primary Examiner* — Eileen M Adams
(74) *Attorney, Agent, or Firm* — Knobbe, Martens, Olson & Bear, LLP

(57) ABSTRACT

An imaging method includes determining heading of a digital weapon sight, determining heading of a helmet mounted display, and calculating difference between the heading of the digital weapon sight and the heading of the helmet mounted display. When the difference between the heading of the digital weapon sight and the heading of the helmet mounted display is outside of a predetermined range image data communication between the digital weapon sight and the helmet mounted display is disabled. Imaging systems and weapons assemblies having imaging systems are also described.

22 Claims, 5 Drawing Sheets

(56) References Cited

U.S. PATENT DOCUMENTS

| | | |
|---|---|---|
| 4,601,540 A | 7/1986 | Karning et al. |
| 4,605,281 A | 8/1986 | Hellewell |
| 4,698,489 A | 10/1987 | Morley |
| 4,758,719 A | 7/1988 | Sasaki et al. |
| 4,786,966 A | 11/1988 | Hanson et al. |
| 4,792,206 A | 12/1988 | Skuratovsky |
| 4,840,451 A | 6/1989 | Sampson et al. |
| 5,005,213 A | 4/1991 | Hanson et al. |
| 5,035,472 A | 7/1991 | Hansen |
| 5,125,394 A | 6/1992 | Chatenever et al. |
| 5,128,807 A | 7/1992 | Blackmon |
| 5,140,151 A | 8/1992 | Weiner et al. |
| 5,303,606 A | 4/1994 | Kokinda |
| 5,359,675 A | 10/1994 | Siwoff |
| 5,448,161 A | 9/1995 | Byerley, III et al. |
| 5,463,495 A | 10/1995 | Murg |
| 5,513,440 A | 5/1996 | Murg |
| 5,535,053 A | 7/1996 | Baril et al. |
| 5,584,137 A | 12/1996 | Teetzel |
| 5,651,081 A | 7/1997 | Blew et al. |
| 5,653,034 A | 8/1997 | Bindon |
| 5,668,904 A | 9/1997 | Sutherland et al. |
| 5,687,271 A | 11/1997 | Rabinowitz |
| 5,711,104 A | 1/1998 | Schmitz |
| 5,847,753 A | 12/1998 | Gabello et al. |
| 5,903,996 A | 5/1999 | Morley |
| 5,946,132 A | 8/1999 | Phillips |
| 5,949,565 A | 9/1999 | Ishida |
| 5,953,761 A | 9/1999 | Jurga et al. |
| 5,956,444 A | 9/1999 | Duda et al. |
| 6,020,994 A | 2/2000 | Cook |
| 6,057,966 A | 5/2000 | Carroll et al. |
| 6,200,041 B1 | 3/2001 | Gaio et al. |
| 6,272,692 B1 | 8/2001 | Abraham |
| 6,311,576 B1 | 11/2001 | Pletschet |
| 6,327,381 B1 | 12/2001 | Rogina et al. |
| 6,369,941 B2 | 4/2002 | Zadravec |
| 6,381,081 B1 | 4/2002 | Ford |
| 6,404,961 B1 | 6/2002 | Bonja et al. |
| 6,456,497 B1 | 9/2002 | Palmer |
| 6,519,890 B1 | 2/2003 | Otterman |
| 6,560,029 B1 | 5/2003 | Dobbie et al. |
| 6,574,053 B1 | 6/2003 | Spinali |
| 6,615,531 B1 | 9/2003 | Holmberg |
| 6,690,866 B2 | 2/2004 | Bonja et al. |
| 6,714,708 B2 | 3/2004 | McAlpine et al. |
| 6,807,742 B2 | 10/2004 | Schick et al. |
| 6,898,192 B2 | 5/2005 | Chheda et al. |
| 6,901,221 B1 | 5/2005 | Jiang et al. |
| 7,016,579 B2 | 3/2006 | Militaru et al. |
| 7,062,796 B1 | 6/2006 | Dixon |
| D524,785 S | 7/2006 | Huang |
| 7,069,685 B2 | 7/2006 | Houde-Walter |
| 7,096,512 B2 | 7/2006 | Blair |
| 7,128,475 B2 | 10/2006 | Kesler |
| 7,132,648 B2 | 11/2006 | Ratiff et al. |
| 7,166,812 B2 | 1/2007 | White et al. |
| 7,171,776 B2 | 2/2007 | Staley, III |
| 7,194,012 B2 | 3/2007 | Mason et al. |
| 7,210,262 B2 | 5/2007 | Florence et al. |
| 7,210,392 B2 | 5/2007 | Greene et al. |
| 7,219,370 B1 | 5/2007 | Teetzel et al. |
| 7,278,734 B2 | 10/2007 | Jannard et al. |
| 7,292,262 B2 | 11/2007 | Towery et al. |
| 7,298,941 B2 | 11/2007 | Palen et al. |
| 7,319,557 B2 | 1/2008 | Tai |
| 7,369,302 B2 | 5/2008 | Gaber |
| 7,409,792 B2 | 8/2008 | Narcy et al. |
| 7,437,848 B2 | 10/2008 | Chang |
| 7,462,035 B2 | 12/2008 | Lee et al. |
| 7,488,294 B2 | 2/2009 | Torch |
| 7,552,559 B2 | 6/2009 | Day |
| 7,609,467 B2 | 10/2009 | Blanding et al. |
| 7,612,956 B2 | 11/2009 | Blanding et al. |
| 7,627,975 B1 | 12/2009 | Hines |
| 7,649,550 B2 | 1/2010 | Ishiyama et al. |
| 7,676,137 B2 | 3/2010 | Schick et al. |
| 7,690,849 B2 | 4/2010 | Scharf et al. |
| 7,701,493 B2 | 4/2010 | Mauritzson |
| 7,705,855 B2 | 4/2010 | Brown |
| 7,710,654 B2 | 5/2010 | Ashkenazi et al. |
| 7,730,820 B2 | 6/2010 | Vice et al. |
| 7,740,499 B1 | 6/2010 | Willey et al. |
| 7,744,286 B2 | 6/2010 | Lu et al. |
| 7,787,012 B2 | 8/2010 | Scales et al. |
| 7,795,574 B2 | 9/2010 | Kennedy et al. |
| 7,800,852 B2 | 9/2010 | Blanding et al. |
| 7,827,723 B1 | 11/2010 | Zaderey et al. |
| 7,832,023 B2 | 11/2010 | Crisco |
| 7,842,922 B2 | 11/2010 | Leneke et al. |
| 7,899,332 B2 | 3/2011 | Shindou et al. |
| 7,911,687 B2 | 3/2011 | Scholz |
| 7,916,156 B2 | 3/2011 | Brown et al. |
| 7,933,464 B2 | 4/2011 | Zhang et al. |
| 7,952,059 B2 | 5/2011 | Vitale et al. |
| 7,972,067 B2 | 7/2011 | Haley et al. |
| 7,990,523 B2 | 8/2011 | Schlierbach et al. |
| 8,014,679 B2 | 9/2011 | Yamazaki |
| 8,063,934 B2 | 11/2011 | Donato |
| 8,067,735 B2 | 11/2011 | King et al. |
| 8,082,688 B2 | 12/2011 | Elpedes et al. |
| 8,085,482 B2 | 12/2011 | Frankovich et al. |
| 8,093,992 B2 | 1/2012 | Jancic et al. |
| 8,112,185 B2 | 2/2012 | Wu |
| 8,153,975 B2 | 4/2012 | Hollander et al. |
| 8,225,542 B2 | 7/2012 | Houde-Walter |
| 8,253,105 B1 | 8/2012 | Warnke et al. |
| 8,312,667 B2 | 11/2012 | Thomas et al. |
| 8,336,776 B2 | 12/2012 | Horvath et al. |
| 8,337,036 B2 | 12/2012 | Soto et al. |
| 8,350,796 B2 | 1/2013 | Tomizawa et al. |
| 8,375,620 B2 | 2/2013 | Staley, III |
| D677,298 S | 3/2013 | Hallgren |
| 8,411,346 B2 | 4/2013 | Sapir |
| 8,488,969 B1 | 7/2013 | Masarik |
| 8,531,592 B2 | 9/2013 | Teetzel et al. |
| 8,532,490 B2 | 9/2013 | Smith et al. |
| 8,656,628 B2 | 2/2014 | Jock et al. |
| 8,717,392 B2 | 5/2014 | Levola |
| 8,773,766 B2 | 7/2014 | Jannard et al. |
| 8,776,422 B2 | 7/2014 | Dodd et al. |
| 8,781,273 B2 | 7/2014 | Benjamin et al. |
| 8,826,583 B2 | 9/2014 | Kepler et al. |
| 8,849,379 B2 | 9/2014 | Abreu |
| 8,886,046 B2 | 11/2014 | Masarik |
| 8,908,045 B2 | 12/2014 | Stewart |
| 8,923,703 B2 | 12/2014 | Masarik |
| 8,928,878 B2 | 1/2015 | Jaeschke et al. |
| 8,942,632 B2 | 1/2015 | Shen |
| 9,042,736 B2 | 5/2015 | Masarik |
| 9,052,153 B2 | 6/2015 | Oh et al. |
| 9,057,583 B2 | 6/2015 | Matthews et al. |
| 9,069,001 B2 | 6/2015 | Braman et al. |
| 9,113,061 B1 | 8/2015 | Morley |
| 9,225,419 B2 | 12/2015 | Masarik |
| 9,310,163 B2 | 4/2016 | Bay |
| 9,316,462 B2 | 4/2016 | Varshneya |
| 9,319,143 B2 | 4/2016 | El-Ahmadi et al. |
| 9,335,122 B2 | 5/2016 | Choiniere |
| 9,373,277 B2 | 6/2016 | Sagan |
| 9,389,677 B2 | 7/2016 | Hobby et al. |
| 9,429,391 B2 | 8/2016 | Walker |
| 9,438,774 B2 | 9/2016 | Masarik |
| 9,466,120 B2 | 10/2016 | Maryfield et al. |
| 9,506,725 B2 | 11/2016 | Maryfield et al. |
| 9,516,202 B2 | 12/2016 | Masarik et al. |
| 9,615,004 B2 | 4/2017 | Masarik |
| 9,622,529 B2 | 4/2017 | Teetzel et al. |
| 9,658,423 B2 | 5/2017 | Gustafson et al. |
| 9,696,111 B2 | 7/2017 | Saadon |
| 9,705,605 B2 | 7/2017 | Masarik |
| 9,769,902 B1 | 9/2017 | Cain et al. |
| 9,823,043 B2 | 11/2017 | Compton et al. |
| 9,861,263 B2 | 1/2018 | Kwan et al. |

(56) References Cited

U.S. PATENT DOCUMENTS

| | | |
|---|---|---|
| 9,897,411 B2 | 2/2018 | Compton et al. |
| 9,910,259 B2 | 3/2018 | Armbruster et al. |
| 9,921,028 B2 | 3/2018 | Compton et al. |
| 9,934,739 B2 | 4/2018 | Hogan |
| 9,948,878 B2 | 4/2018 | Simolon et al. |
| 9,995,901 B2 | 6/2018 | Petersen |
| 10,003,756 B2 | 6/2018 | Masarik et al. |
| 10,024,631 B2 | 7/2018 | Portoghese et al. |
| 10,036,869 B2 | 7/2018 | Fahr et al. |
| 10,095,089 B2 | 10/2018 | Po et al. |
| 10,113,837 B2 | 10/2018 | Masarik et al. |
| 10,190,848 B2 | 1/2019 | VanBecelaere |
| 10,309,749 B2 | 6/2019 | Hamilton |
| 10,379,135 B2 | 8/2019 | Maryfield et al. |
| 2002/0027690 A1 | 3/2002 | Bartur et al. |
| 2004/0031184 A1 | 2/2004 | Hope |
| 2005/0232512 A1 | 10/2005 | Luk et al. |
| 2005/0254126 A1 | 11/2005 | Lin et al. |
| 2005/0268519 A1 | 12/2005 | Pikielny |
| 2006/0165413 A1 | 7/2006 | Schemmann et al. |
| 2007/0003562 A1 | 1/2007 | Druilhe |
| 2007/0035626 A1 | 2/2007 | Randall et al. |
| 2007/0213586 A1 | 9/2007 | Hirose et al. |
| 2008/0263752 A1 | 10/2008 | Solinsky et al. |
| 2008/0309586 A1 | 12/2008 | Vitale |
| 2008/0317474 A1 | 12/2008 | Wang et al. |
| 2009/0052023 A1 | 2/2009 | Winker et al. |
| 2009/0181729 A1 | 7/2009 | Griffin, Jr. et al. |
| 2010/0027943 A1 | 2/2010 | Armani et al. |
| 2010/0149073 A1 | 6/2010 | Chaum et al. |
| 2010/0225673 A1 | 9/2010 | Miller et al. |
| 2010/0266245 A1 | 10/2010 | Sabo |
| 2010/0308999 A1 | 12/2010 | Chornenky |
| 2010/0328420 A1 | 12/2010 | Roman |
| 2011/0041377 A1 | 2/2011 | Thomas et al. |
| 2011/0067288 A1 | 3/2011 | Hakansson et al. |
| 2011/0145981 A1 | 6/2011 | Teetzel |
| 2011/0187563 A1 | 8/2011 | Sanders-Reed |
| 2011/0213664 A1 | 9/2011 | Osterhout et al. |
| 2011/0214082 A1 | 9/2011 | Osterhout et al. |
| 2011/0239354 A1 | 10/2011 | Celona et al. |
| 2012/0030985 A1 | 2/2012 | Mauricio et al. |
| 2012/0033195 A1 | 2/2012 | Tai |
| 2012/0097741 A1 | 4/2012 | Karcher |
| 2012/0159833 A1 | 6/2012 | Hakanson et al. |
| 2012/0182417 A1 | 7/2012 | Everett |
| 2012/0182610 A1 | 7/2012 | O'Hara et al. |
| 2012/0192476 A1 | 8/2012 | Compton et al. |
| 2012/0212414 A1 | 8/2012 | Osterhout et al. |
| 2012/0238208 A1 | 9/2012 | Bienas et al. |
| 2012/0255213 A1 | 10/2012 | Panos |
| 2012/0311910 A1 | 12/2012 | Mironichev et al. |
| 2012/0317706 A1 | 12/2012 | Lebel et al. |
| 2012/0320340 A1 | 12/2012 | Coleman, III |
| 2012/0327247 A1 | 12/2012 | Mironichev et al. |
| 2013/0016215 A1 | 1/2013 | Bitar et al. |
| 2013/0033746 A1 | 2/2013 | Brumfield |
| 2013/0036646 A1 | 2/2013 | Rubac et al. |
| 2013/0072120 A1 | 3/2013 | Wu |
| 2013/0088604 A1 | 4/2013 | Hamrelius et al. |
| 2013/0167425 A1 | 7/2013 | Crispin |
| 2013/0188943 A1 | 7/2013 | Wu |
| 2013/0215395 A1 | 8/2013 | Li |
| 2014/0007485 A1 | 1/2014 | Castejon, Sr. |
| 2014/0104449 A1 | 4/2014 | Masarik et al. |
| 2014/0260748 A1 | 9/2014 | Traver |
| 2015/0101234 A1 | 4/2015 | Priest et al. |
| 2015/0226613 A1 | 8/2015 | Bauer et al. |
| 2015/0282549 A1 | 10/2015 | Lebel et al. |
| 2015/0316351 A1 | 11/2015 | Choiniere |
| 2016/0033234 A1 | 2/2016 | Swift et al. |
| 2016/0327365 A1 | 11/2016 | Collin et al. |
| 2017/0010073 A1 | 1/2017 | Downing |
| 2017/0078022 A1 | 3/2017 | Masarik et al. |
| 2017/0153713 A1* | 6/2017 | Niinuma ................ G06F 3/017 |
| 2017/0237919 A1 | 8/2017 | Lamesch |
| 2017/0302386 A1 | 10/2017 | Masarik |
| 2018/0232952 A1* | 8/2018 | Hiranandani ......... G06T 19/006 |
| 2018/0246135 A1 | 8/2018 | Pan et al. |
| 2018/0302576 A1 | 10/2018 | Masarik et al. |
| 2019/0033039 A1 | 1/2019 | Masarik et al. |
| 2019/0094981 A1* | 3/2019 | Bradski ................ H04N 13/204 |
| 2019/0166174 A1 | 5/2019 | Moseman |
| 2019/0353461 A1 | 11/2019 | Neal et al. |
| 2019/0353462 A1 | 11/2019 | Neal |

FOREIGN PATENT DOCUMENTS

| | | |
|---|---|---|
| CN | 204944509 | 1/2016 |
| EP | 0 176 169 | 4/1986 |
| EP | 2 722 632 | 4/2014 |
| EP | 2 812 749 | 12/2014 |
| EP | 3 172 524 | 5/2017 |
| EP | 3 205 974 | 8/2017 |
| EP | 3 239 754 | 11/2017 |
| GB | 2162654 | 2/1986 |
| JP | H07-295682 | 11/1995 |
| WO | WO 2005/121688 | 12/2005 |
| WO | WO 2013/080058 | 6/2013 |
| WO | WO 2013/102869 | 7/2013 |
| WO | WO 2013/119983 | 8/2013 |
| WO | WO 2014/062725 | 4/2014 |
| WO | WO 2014/150076 | 9/2014 |
| WO | WO 2016/014655 | 1/2016 |
| WO | WO 2019/222422 | 11/2019 |
| WO | WO 2019/222426 | 11/2019 |

OTHER PUBLICATIONS

Ackerman, S., "It Only Took the Army 16 Years and 2 Wars to Deploy this Network", Wired.com, Jun. 28, 2012, in 7 pages. URL: http://www.wired.com/dangerrom/2012/06/army-data-network-war/all/.

Armstrong, S. C., "Project Manager Soldier Weapons Program Overview NDIA", May 15, 2012, in 38 pages.

Schott—Glass Made of Ideas, GBPS-MC-GOF-Demo, dated Jan. 2006, pp. S.1-S.8, in 8 pages.

Sklarek, W., High Data Rate Capabilities of Multicore Glass Optical Fiber Cables, 22 FGT "Otische Polymerfasern", dated Oct. 25, 2006, in 19 pages. URL: http://www.pofac.de/downloads/itgfg/fgt2.2/FGT2.2_Munchen_Sklarek_GOF-Buendel.

Tao, R. et al., "10 Gb/s CMOS Limiting Amplifier for Optical links", Proceedings of the 29th European Solid-State Circuits Conference, Sep. 16-18, 2013, pp. 285-287, Estoril, Portugal, in 3 pages.

U.S. Appl. No. 13/674,895, filed Nov. 12, 2012, titled Intrapersonal Data Communication System, listing David Michael Masarik as an inventor, in 95 pages, and its entire prosecution history.

* cited by examiner

DATA COMMUNICATION BETWEEN IMAGE SENSORS AND IMAGE DISPLAYS

BACKGROUND OF THE INVENTION

1. Field of the Invention

The present disclosure relates to imaging, and more particularly to communicating image data between image sensors and displays, such as between weapon sights and goggle displays.

2. Description of Related Art

Digital weapon sights are commonly used to generate imagery corresponding to the heading of a weapon. The imagery can be communicated to a display remote from the digital weapon site, such as in a helmet mounted goggle display, where the imagery from the digital weapon sight can be incorporated into imagery corresponding the field of view of goggles. This can provide the user awareness of heading of the weapon in relation to the orientation of the goggles, facilitating use of the weapon via the goggle display. In some goggle systems a user can toggle between a weapon sight-in-goggle and a reticle-in-goggle mode. These modes allow a user to be aware of digital weapon sight heading relative to goggles field of view, typically by overlaying a reticle representative of the digital weapon sight heading or actual video of where the digital weapon sight is heading in the helmet mounted goggle display.

Communicating video data from a digital weapon sight to a helmet mounted goggle display generally requires power. During intervals where heading of the digital weapon sight is outside the field of view of the goggle video data from the digital weapon can be of limited use, and the power consumption associated with communicating the video unnecessary.

Such conventional methods and systems have generally been considered satisfactory for their intended purpose. However, there is still a need in the art for improved data communication between digital weapon sights and helmet mounted displays. The present disclosure provides a solution for this need.

SUMMARY OF THE INVENTION

An imaging method includes determining heading of a digital weapon sight, determining heading of a helmet mounted display, and calculating difference between the heading of the digital weapon sight and the heading of the helmet mounted display. When the difference between the heading of the digital weapon sight and the heading of the helmet mounted display is outside of a predetermined range image data communication between the digital weapon sight and the helmet mounted display is disabled.

In certain embodiments image data communication between the digital weapon sight and the helmet mounted display can be enabled when the difference between the heading of the digital weapon sight and the heading of the helmet mounted display is outside of the predetermined range. The heading difference can be calculated at the digital weapon sight. The heading difference can be calculated at the helmet mounted display. Heading of the digital weapon sight can be communicated to the helmet mounted display using a low-bandwidth wireless channel. Heading of the helmet mounted display can be communicated to the digital weapon sight using a low-bandwidth wireless channel.

In accordance with certain embodiments image data communication between the digital weapon sight and the helmet mounted display using the high-bandwidth wireless channel can cease once image data communication is disabled. The method can include establishing a radio frequency link between the digital weapon sight and the helmet mounted display. The radio frequency link can have a low-bandwidth wireless channel and a high-bandwidth wireless channel. Inertial data can be collected at the digital weapon sight. Inertial data can be collected at the helmet mounted display. Inertial data can be generated at both the digital weapon sight and the helmet mounted display.

It is also contemplated that, in accordance with certain embodiments, the method can include toggling the helmet mounted display into a reticle pop-up mode, displaying a reticle in the helmet mounted display, and removing the reticle from the helmet mounted display when the difference between the heading of the digital weapon sight and the heading of the helmet mounted display is outside of a predetermined range. The reticle can be removed from the helmet mounted display while the helmet mounted display remains in the reticle pop-up mode. The reticle can be returned to the helmet mounted display when the difference between the heading of the digital weapon sight and the heading of the helmet mounted display is outside of a predetermined range.

An imaging system includes a digital weapon sight with an inertial measurement unit (IMU), a helmet mounted display with an IMU, and a wireless module coupling the sight to the helmet mounted display. A controller is operatively connected to the wireless module and responsive to instructions recorded on a memory to determine heading of a digital weapon sight, determine heading of a helmet mounted display, and calculate difference between the heading of the digital weapon sight and the heading of the helmet mounted display. The controller disables image data communication between the digital weapon sight and the helmet mounted display when the difference between the heading of the digital weapon sight and the heading of the helmet mounted display is outside of a predetermined range.

In certain embodiments the digital weapon sight can include an image sensor. The wireless module can couple the digital weapon sight image sensor to the helmet mounted display. The helmet mounted display can include an image sensor and a display. The helmet mounted display image sensor can have a field of view. The instructions can cause the controller to disable image data communication between the digital weapon sight and the helmet mounted display when heading of the digital weapon scope is outside of the field of view of the helmet mounted display image sensor. The helmet mounted display can be a goggle display.

In accordance with certain embodiments, the instructions can cause the controller to enable image data communication between the digital weapon sight and the helmet mounted display when the difference between heading of the digital weapon sight and heading of the helmet mounted display is outside of the predetermined range. The controller can be fixed relative to the helmet mounted display. The controller can be disposed in communication with the digital weapon sight IMU or the helmet mounted display IMU through the wireless module.

It is contemplated that the wireless module can include a low-bandwidth channel and a high-bandwidth channel. The controller can be disposed in communication with the weapon sight IMU or the helmet mounted display IMU through the low-bandwidth channel. The digital weapon sight can be disposed in communication with the helmet mounted display through the high-bandwidth channel. The digital weapon sight can include a scope with an imaging array.

A weapon assembly includes a weapon, imaging system as described above, and a battery. The digital weapon sight is fixed relative to the weapon and the helmet mounted display is movable relative to the weapon such that heading of the digital weapon sight can be outside a field of view of the helmet mounted display. The battery is in electrical communication, i.e., is electrically connected, with the imaging system, the controller disabling of the data communication between the digital weapon sight and the helmet mounted display conserving battery life when heading of the digital weapon sight is outside the field of view of the helmet mounted display.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
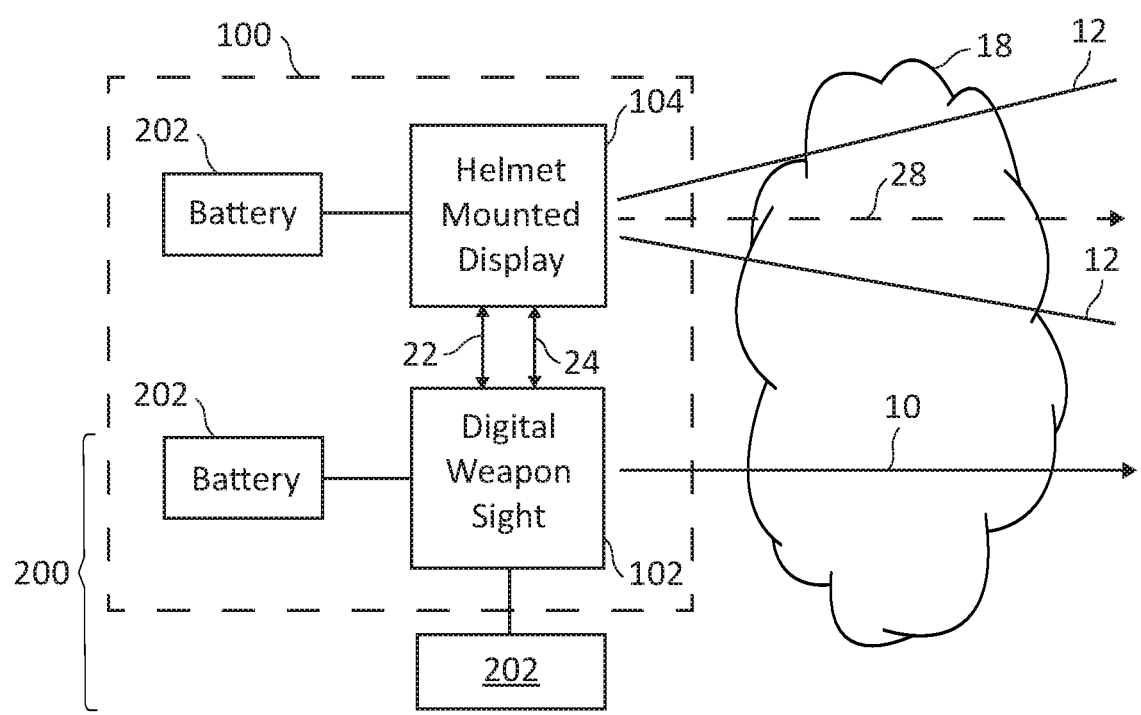
FIG. 1 is a schematic view of view of an exemplary embodiment of a weapon assembly constructed in accordance with the present disclosure, showing an imaging system include a helmet mounted display and a digital weapon site.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems, imaging methods, and weapon assemblies in accordance with the disclosure, or aspects thereof, are provided in FIGS. 2-5, as will be described. The systems and methods described herein can be used for image data communication between digital weapon sights and helmet mounted displays, such as in imaging systems include helmet mounted goggle displays and digital weapon sights in soldier kit, though the present disclosure is not limited to goggle displays to military applications in general.

Referring to FIG. 1, a weapon assembly 200 is shown. Weapon assembly 200 includes a weapon 202, imaging system 100, and one or more battery 204. Imaging system 100 includes a digital weapon sight 102 and a helmet mounted display 104. Digital weapon sight 102 is fixed relative to weapon 202 and helmet mounted display 104 is movable relative to weapon 202 such that heading 10 of digital weapon sight 102 can be outside a field of view 12 of helmet mounted display 104. Battery 204 is in electrical communication with imaging system 100 and controller 106 operative to disable image data communication between digital weapon sight 102 and helmet mounted display 104 to limit power consumption when the heading 10 of digital weapon sight 102 is outside the field of view 12 of helmet mounted display 104.

Figure 2:
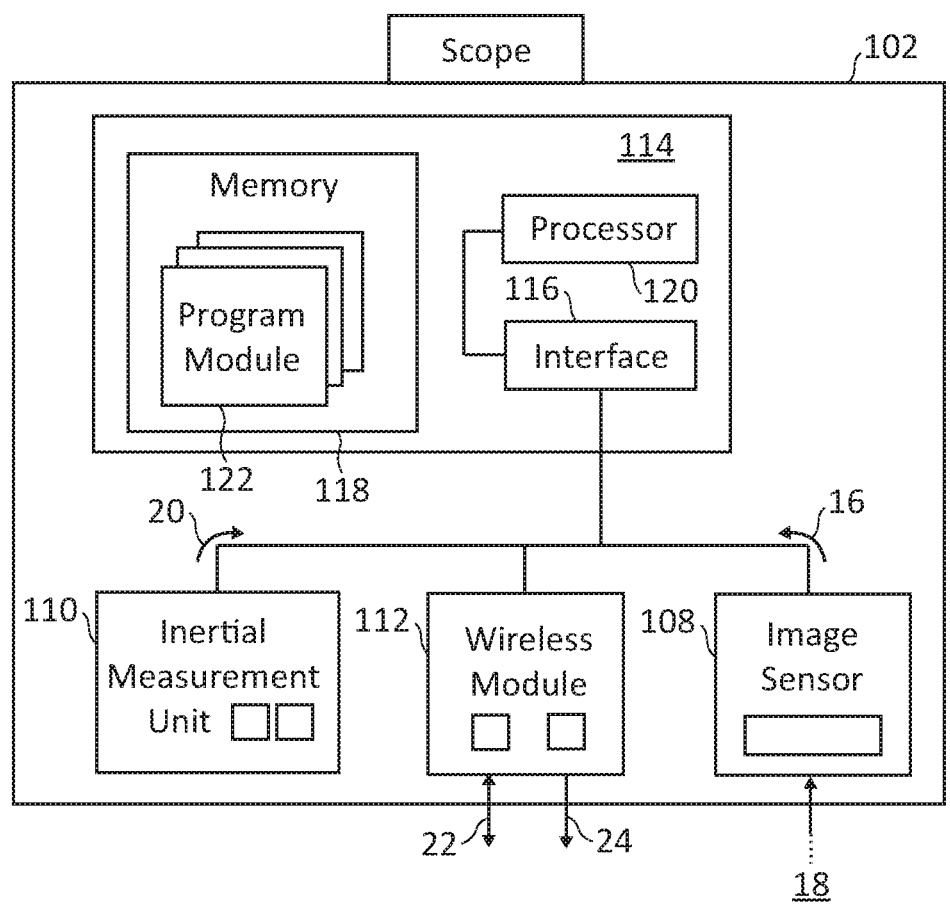
FIG. 2 is a schematic view of the helmet mounted display of FIG. 1, showing elements of the helmet mounted display including an image sensor a field of view and a display module.

With reference to FIG. 2, digital weapon sight 102 is shown. Digital weapon sight 102 is configured and adapted for fixation to weapon 202 (shown in FIG. 1), such as by being coaxially aligned with a bore of the weapon 202, and includes an image sensor 108, an inertial measurement unit (IMU) 110, a wireless module 112, and a controller 114. Image sensor 108 is aligned along the heading 10 (shown in FIG. 1) of digital weapon sight 102, includes a photodiode array, and is configured and adapted for generating image data 26 of a scene 18 in the direction the heading 10 of digital weapon sight 102. IMU 110 is configured and adapted for generating heading data 20 indicative of heading 10 (shown in FIG. 1) of digital weapon sight 102. Heading data 20 can be, for example, indicative of azimuth and elevation of digital weapon sight 102 by way of non-limiting example. In certain embodiments IMU 110 can include one or more a gyroscope and/or accelerometer. In the exemplary embodiment shown in FIG. 2 digital weapon sight 102 is incorporated in a scope.

Wireless module 112 is configured and adapted for communicating wirelessly with helmet mounted display 104 (shown in FIG. 1). In this respect wireless module 112 is configured and adapted for passing heading data 20 over a low-bandwidth channel 22 (shown in FIG. 1) coupling digital weapon sight 102 with helmet mounted display 104. Wireless module 112 is additionally configured and adapted for passing image data 26 over a high-bandwidth channel 24 (shown in FIG. 1) coupling digital weapon sight 102 with helmet mounted display 104.

Controller 114 is disposed in communication with IMU 110 and is operatively connected to both image sensor 108 and wireless module 112 for controlling communication at least one of heading data 20 and/or image data 14 between digital weapons sight 102 and helmet mounted display 104 (shown in FIG. 1). In this respect controller 114 includes an interface 116, a memory 118, and a processor 120 disposed in communication with interface 116 and memory 118. Memory 118 has a plurality of program modules 122 recorded on it that, when read by processor 120, cause processor to execute certain operations, e.g., operations of an imaging method 200. In this regard controller 114 is arranged to selectively communicate image data between digital weapon sight 102 and helmet mounted display 104, digital weapon sight 102 passing image data 26 to helmet mounted display 104 when heading 10 is within field of view 12, digital weapon sight 102 passing image data 26 to helmet mounted display 104 when heading 10 is outside field of view 12. This reduces power drawn from battery 202 (shown in FIG. 1).

Figure 3:
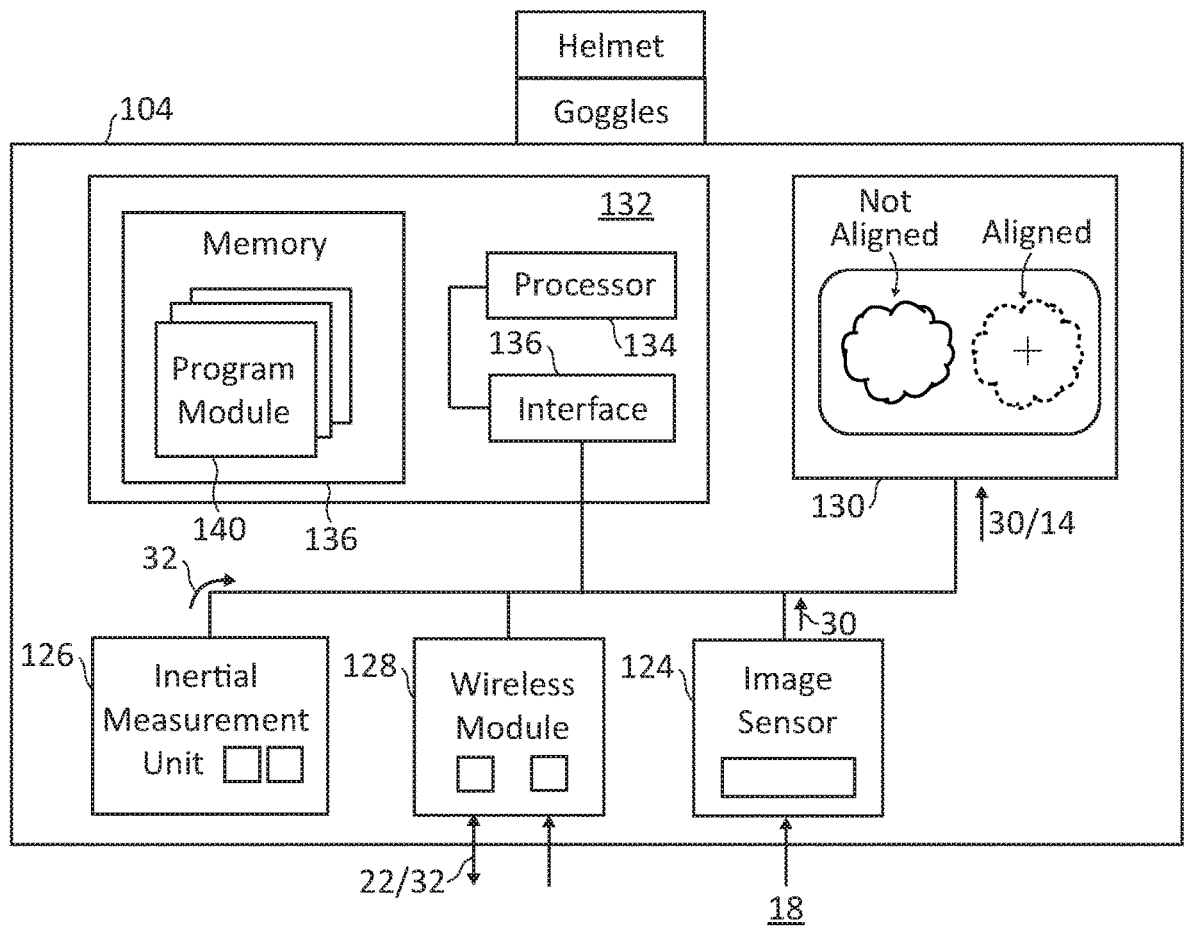
FIG. 3 is a schematic view of the digital weapon sight of FIG. 1, showing elements of the digital weapon sight including an image sensor with heading and a wireless module.

With reference to FIG. 3, helmet mounted display 104 is shown. Helmet mounted display 104 is configured and adapted for mounting to a helmet and includes and includes image sensor 124, an IMU 126, and a wireless module 128. Helmet mounted display 104 also includes a display 130 and a controller 132. In the illustrated exemplary embodiment helmet mounted display 104 is integrated into a set of goggles, the goggles in turn being mounted to a helmet. As will be appreciated by those of skill in the art in view of the present disclosure, other types of display devices can benefit from the present disclosure.

Image sensor 124 has field of view 12 (shown in FIG. 1) and is configured and adapted for generating image data 30 of scene 18 (shown in FIG. 1). IMU 126 is configured and adapted for generating heading data 32 indicative of the heading 12 of helmet mounted display 104. Heading data 32 can be, for example, indicative of azimuth and elevation of helmet mounted display 104 by way of non-limiting example. In certain embodiments IMU 126 can one or more gyroscope and/or accelerometer.

Wireless module 128 is configured and adapted for communicating wirelessly with digital weapon sight 102 (shown in FIG. 1). In this respect wireless module 112 is configured and adapted for passing heading data 20, received from digital weapon sight 102 via low-bandwidth channel 22, to controller 132. Wireless module 112 is also configured and adapted for receiving image data 26, received via high-bandwidth channel 24 coupling digital weapon sight 102 and helmet mounted display 104, from digital weapon sight 102.

Controller 132 is disposed in communication with IMU 126 and is operatively connected to image sensor 124, wireless module 128, and display 130 for displaying at least one of image data 26 from the image sensor 108 of digital weapon sight 102 and the image data 30 from image sensor 124 of helmet mounted display 104. In this respect controller 132 includes an interface 134, a memory 136, and a processor 138 disposed in communication with interface 134 and memory 136. Memory 136 has a plurality of program modules 140 recorded on it that, when read by processor 138, cause processor 138 to execute certain operations, e.g., the operations of imaging method 200 (shown in FIG. 5). It is contemplated that controller 132 can be implemented with circuitry, software, or a combination or circuitry and software.

Figure 4B:
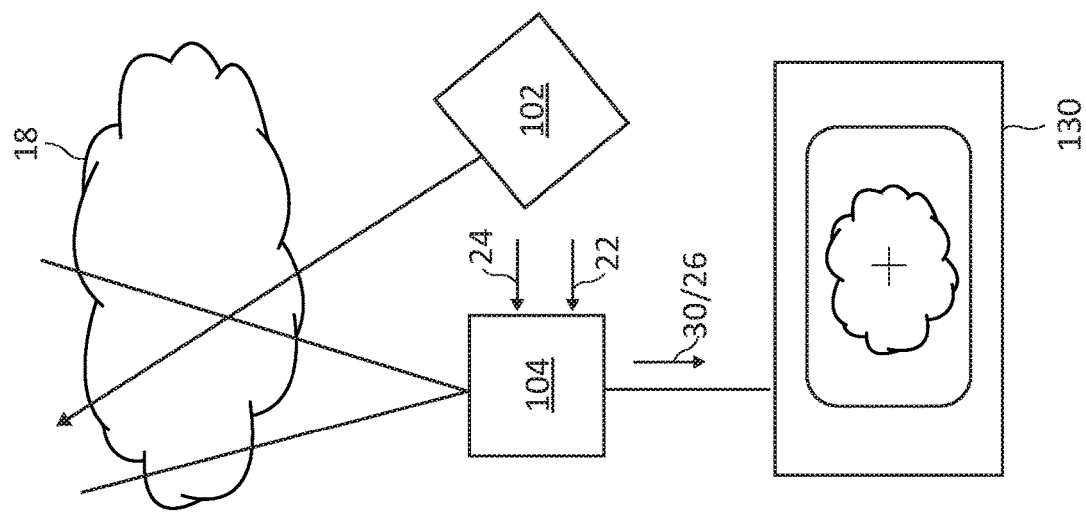
FIGS. 4A and 4B are schematic views of the imaging system of FIG. 1, showing a controller disabling and enabling image data communication between the digital weapon sight image sensor and the helmet mounted display according to whether heading of the digital weapon sight is within the field of view of the helmet mounted display image sensor.
Figure 4A:
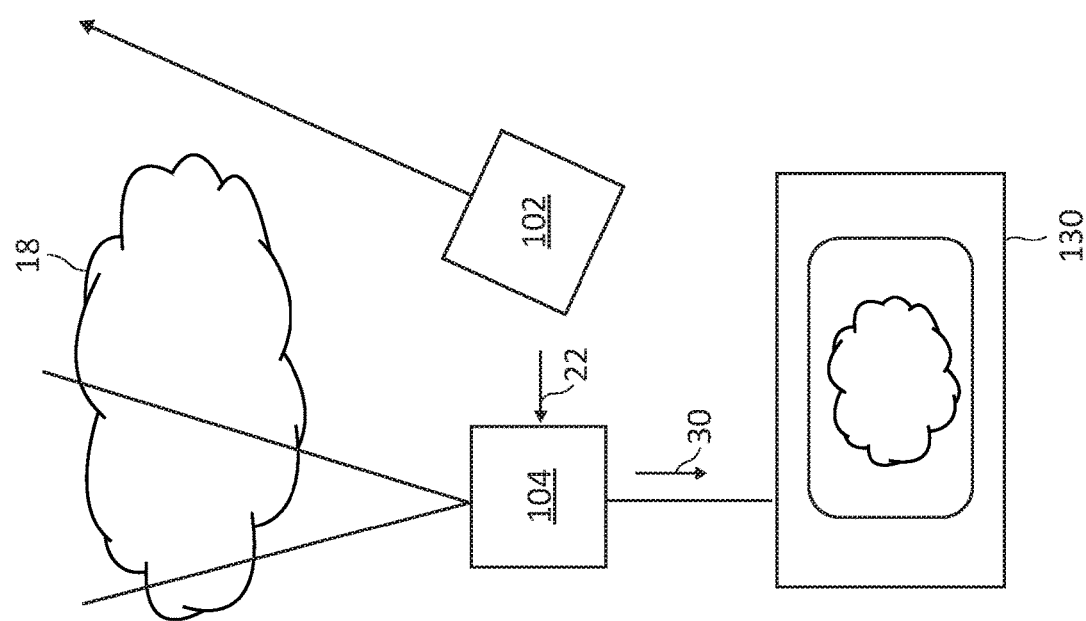

With reference to FIGS. 4A and 4B, display 130 is shown with imaging system 100 in reticle "pop-up" mode. In certain embodiments the instruction recorded in program modules 122 detect instances where difference between heading 10 of digital weapon sight 102 and heading 26 of helmet mounted display 104 is such that heading 10 is outside the field of view 12 of helmet mounted display 104. Upon detection of such instances controller 114 throttles down video transmission between digital weapon sight 102 and helmet mounted display 104, reducing power draw from battery 204 (shown in FIG. 1). For example, the instructions recorded on program modules 122 can cause controller 114 to disable communication of image data 14 between digital weapon sight 102 and helmet mounted display 104 when heading 10 of digital weapon scope 102 is outside of field of view 12 of an image sensor 124 (shown in FIG. 3) of helmet mounted display 104.

Figure 5:
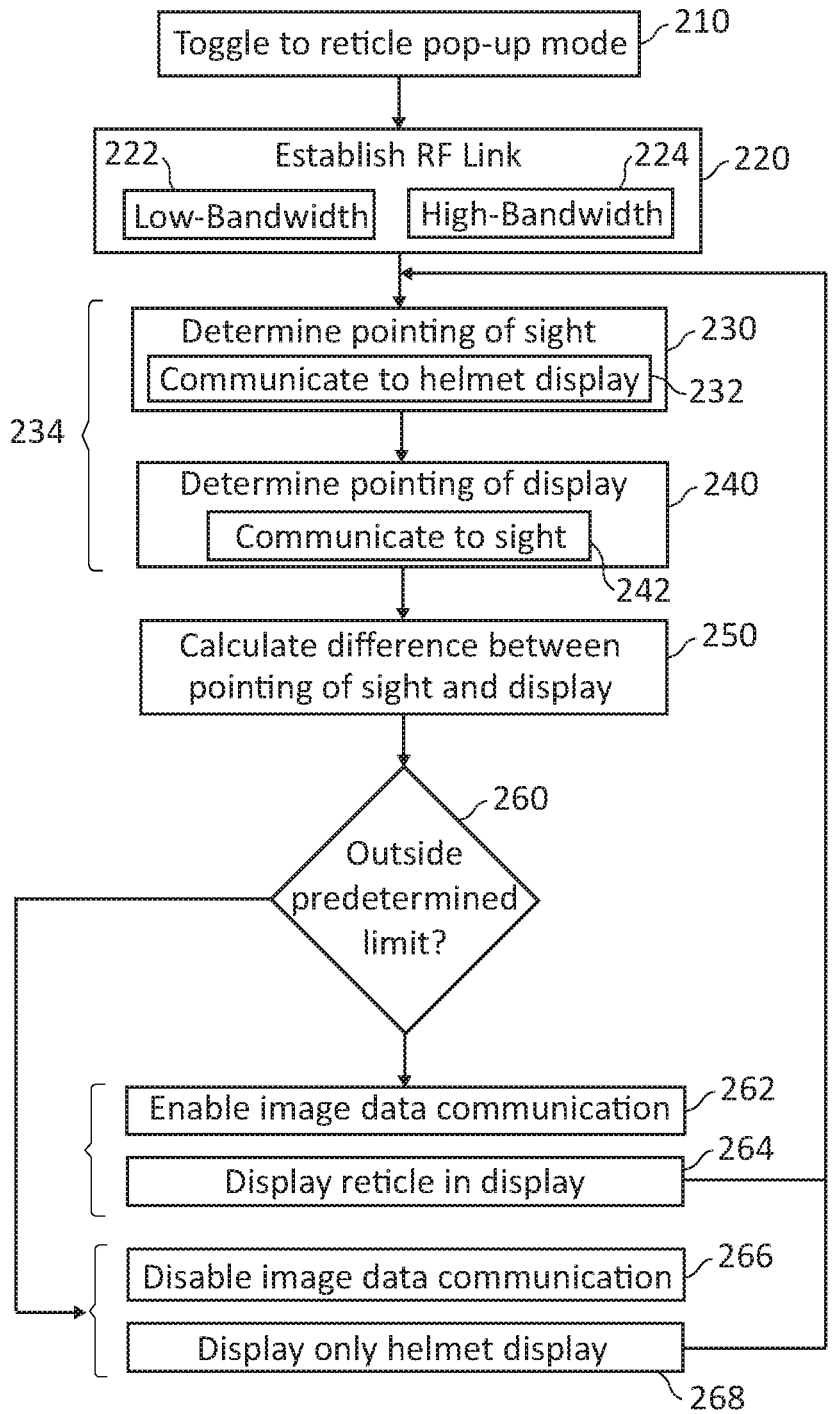
FIG. 5 is block diagram of an imaging method, showing steps of the imaging method according to an exemplary embodiment.

With reference to FIG. 5, imaging method 200 is shown. Imaging method 200 includes determining heading of a digital weapon sight, e.g., digital weapon sight 102 (shown in FIG. 1), as shown with box 230. Imaging method 200 also includes determining heading of a helmet mounted display, e.g., helmet mounted display 104 (shown in FIG. 1), as shown with box 240. Difference between the heading of the digital weapon sight and the helmet mounted display is calculated, as shown with box 250. The difference between heading of the digital weapon sight and the helmet mounted display is compared to a predetermined range, as shown with box 260.

If the difference is within the predetermined range image data communication between digital weapon sight and the helmet mounted display is enabled, as shown in box 262, and image data acquired from the digital weapon sight image sensor is inserted into image data acquired by the helmet mounted display image sensor, as shown with box 264. If the difference is outside of the predetermined range image data communication between digital weapon sight and the helmet mounted display is disabled, as shown in box 266, and image data acquired by the helmet mounted display image sensor without image data from the digital weapon sight image sensor, as shown with box 268. It is contemplated that power can be removed from the transceivers associated with the high-bandwidth data channel and/or the digital weapon sight image sensor when image data communication between the digital weapon sight and helmet mounted display is disabled.

Heading can be determined using inertia data. In this respect it is contemplated that inertial data be generated at both the digital weapon sight and the helmet mounted display, as shown with bracket 230. Inertial data can be collected at the digital weapon sight by communicating the inertial data generated at the helmet mounted display to the digital weapon sight, as shown with box 242. Inertial data can be collected at the helmet mounted display by communicating the inertial data generated at the digital weapon side to the helmet mounted display, as shown with 240. In certain embodiment inertial data can be collected at the helmet mounted display by communicating the inertial data collected at the digital weapon sight to the helmet mounted display, as shown with box 232.

It is contemplated that imaging method 200 include establishing a radio frequency link between the digital weapon sight and the helmet mounted display, as shown with box 220. Establishing the radio frequency link includes establishing a low-bandwidth wireless channel, e.g., low-bandwidth channel 22 (shown in FIG. 1), between the digital weapon sight and the helmet mounted display, as shown with box 222. Establishing the radio frequency link also includes establishing a high-bandwidth wireless channel, e.g., high-bandwidth channel 24 (shown in FIG. 1), between the digital weapon sight and the helmet mounted display, as shown with box 224. The heading data is communicated between the digital weapon sight and the helmet mounted display using the low-frequency channel.

It is also contemplated that, in accordance with certain embodiments, the method can include toggling the helmet mounted display into a reticle pop-up mode, e.g., reticle pop-up module 16 (shown in FIGS. 4A and 4B), as shown in FIG. 210. When in reticle pop-up mode a reticle can be displayed in the helmet mounted display during time intervals that the heading of the digital weapon sight is within the field of view of the helmet mounted display, as shown in with box 264. When in reticle pop-up mode the reticle can be removed from the helmet mounted display during time intervals that the heading of the digital weapon sight is outside the field of view of the helmet mounted display, as shown in with box 268. As will be appreciated by those of skill in the art in view of the present disclosure, disabling image data communication between the digital weapon sight and the helmet mounted display when the digital weapon sight is outside the field of view of the helmet mounted display can reduce power consumption of imaging system 100 (shown in FIG. 1) without degrading functionality of the imaging system.

The methods and systems of the present disclosure, as described above and shown in the drawings, provide for imagine systems, weapon assemblies, and imaging methods with superior properties including reduction in the power required to display image data acquired by a digital weapon sight in image data acquired by a helmet mounted display by disabling image data communication from the digital weapon sight when the digital weapon sight and helmet mounted display are not heading in the same direction. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging method, comprising;
determining heading of a digital weapon sight coupled to a weapon;
determining heading of a helmet mounted display; calculating difference between the heading of the digital weapon sight and the heading of the helmet mounted display; and disabling image data communication between the digital weapon sight and the helmet mounted display when the difference between the heading of the digital weapon sight and the heading of the helmet mounted display is outside of a predetermined range.

2. The imaging method as recited in claim 1, further comprising enabling image data communication between the digital weapon sight and the helmet mounted display when the difference between the heading of the digital weapon sight and the heading of the helmet mounted display is outside of the predetermined range.

3. The imaging method as recited in claim 1, wherein the heading difference is calculated at the digital weapon sight.

4. The imaging method as recited in claim 1, wherein the heading difference is calculated at the helmet mounted display.

5. The imaging method as recited in claim 1, further comprising communicating heading of the digital weapon sight to the helmet mounted display using a low-bandwidth wireless channel.

6. The imaging method as recited in claim 1, further comprising communicating heading of the helmet mounted display to the digital weapon sight using a low-bandwidth wireless channel.

7. The imaging method as recited in claim 1, further comprising ceasing image data communication from the digital weapon sight to the helmet mounted display using a high-bandwidth wireless channel once image data communication is disabled.

8. The imaging method as recited in claim 1, further comprising establishing a radio frequency link between the digital weapon sight and the helmet mounted display having a low-bandwidth wireless channel and a high-bandwidth wireless channel.

9. The imaging method as recited in claim 1, further comprising collecting inertial data at the digital weapon sight.

10. The imaging method as recited in claim 1, further comprising collecting inertial data at the helmet mounted display.

11. The imaging method as recited in claim 1, further comprising:
toggling the helmet mounted display into a reticle pop-up mode;
displaying a reticle in the helmet mounted display; and
removing the reticle from the helmet mounted display when the difference between the heading of the digital weapon sight and the heading of the helmet mounted display is outside of a predetermined range while the helmet mounted display remains in the reticle pop-up mode.

12. The imaging method as recited in claim 11, further comprising returning the reticle to the helmet mounted display when the difference between the heading of the digital weapon sight and the heading of the helmet mounted display is outside of a predetermined range.

13. An imaging system, comprising:
a digital weapon sight with an inertial measurement unit (MU) coupled to a weapon;
a helmet mounted display with an IMU; a wireless module coupling the sight to the helmet mounted display; and a controller operatively connected to the wireless module and responsive to instructions recorded on a memory to determine heading of a digital weapon sight; determine heading of a helmet mounted display; calculate difference between the heading of the digital weapon sight and the heading of the helmet mounted display; and disable image data communication between the digital weapon sight and the helmet mounted display when the difference between the heading of the digital weapon sight and the heading of the helmet mounted display is outside of a predetermined range.

14. The imaging system as recited in claim 13, wherein the digital weapon sight includes an image sensor, the wireless module coupling the image sensor to the helmet mounted display.

15. The imaging system as recited in claim 13, wherein the helmet mounted display includes an image sensor and a display, the wireless module coupling the weapon sight to the display.

16. The imaging system as recited in claim 13, wherein the instructions further cause the controller to enable image data communication between the digital weapon sight and the helmet mounted display when the difference between heading of the digital weapon sight and heading of the helmet mounted display is outside of the predetermined range.

17. The imaging system as recited in claim 13, wherein the wireless module includes a low-bandwidth channel and a high-bandwidth channel, the controller disposed in communication with the weapon sight IMU or the helmet mounted display IMU by the low-bandwidth channel.

18. The imaging system as recited in claim 13, wherein the wireless module includes a low-bandwidth channel and a high-bandwidth channel, digital weapon sight disposed in communication with the helmet mounted display by the high bandwidth channel.

19. The imaging system as recited in claim 13, wherein the helmet mounted display includes an image sensor with a field of view, wherein the controller is configured to disable image data communication between the digital weapon sight and the helmet mounted display when heading of the digital weapon scope is outside of the field of view of the helmet mounted display image sensor.

20. The imaging system as recited in claim 13, wherein the controller is fixed relative to the helmet mounted display and is disposed in communication with IMU of the digital weapon sight by the wireless module.

21. The imaging system as recited in claim 13, wherein the controller is connected to the digital weapon sight IMU or the helmet mounted display IMU by the wireless module.

22. A weapon assembly, comprising:
   a weapon;
   an imaging system as recited in claim 13, wherein the digital weapon sight is fixed relative to the weapon, wherein the helmet mounted display is movable relative to the weapon such that heading of the digital weapon sight can be outside a field of view of the helmet mounted display; and
   a battery in electrical communication with the imaging system, disabling of the data communication between the digital weapon sight and the helmet mounted display conserving battery life when heading of the digital weapon sight is outside the field of view of the helmet mounted display.

* * * * *